United States Patent
Seo et al.

(10) Patent No.: US 8,706,152 B2
(45) Date of Patent: Apr. 22, 2014

(54) METHOD AND APPARATUS OF CONTROLLING UPLINK POWER FOR MULTI-CELL COOPERATIVE SYSTEM

(75) Inventors: Han Byul Seo, Gyeongki-do (KR); Byoung Hoon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 13/119,260

(22) PCT Filed: Sep. 8, 2009

(86) PCT No.: PCT/KR2009/005065
§ 371 (c)(1),
(2), (4) Date: Mar. 16, 2011

(87) PCT Pub. No.: WO2010/035966
PCT Pub. Date: Apr. 1, 2010

(65) Prior Publication Data
US 2011/0171992 A1  Jul. 14, 2011

Related U.S. Application Data

(60) Provisional application No. 61/099,898, filed on Sep. 24, 2008.

(30) Foreign Application Priority Data

Nov. 3, 2008 (KR) .................... 10-2008-0108206

(51) Int. Cl.
*H04B 7/00* (2006.01)

(52) U.S. Cl.
USPC ............... 455/522; 455/69; 455/70; 370/315; 370/316; 370/317; 370/318; 370/319

(58) Field of Classification Search
USPC ............... 455/522, 69–70; 370/315–320
See application file for complete search history.

(56) References Cited

U.S. PATENT DOCUMENTS

| | | | |
|---|---|---|---|
| 5,859,838 A * | 1/1999 | Soliman | 370/249 |
| 2002/0168994 A1 | 11/2002 | Terry et al. | |
| 2008/0008113 A1 * | 1/2008 | Cho et al. | 370/318 |
| 2010/0029212 A1 * | 2/2010 | Malladi et al. | 455/63.1 |

FOREIGN PATENT DOCUMENTS

| | | |
|---|---|---|
| KR | 10-0360830 B1 | 11/2002 |
| WO | WO 02/093952 | 11/2002 |

* cited by examiner

*Primary Examiner* — Fayyaz Alam
(74) *Attorney, Agent, or Firm* — Morgan, Lewis & Bockius LLP

(57) ABSTRACT

A method and apparatus of controlling uplink transmit power is provided. An estimated path-loss value for each of downlink signals from a control base station and one or more neighboring base stations is calculated. A signal path-loss value by using the calculated plurality of estimated path-loss values is obtained. An open-loop power control parameter by using the signal path-loss value is obtained. Uplink power can be controlled by considering cooperative communication of a plurality of base stations in a multi-cell cooperative radio communication system.

6 Claims, 2 Drawing Sheets

METHOD AND APPARATUS OF CONTROLLING UPLINK POWER FOR MULTI-CELL COOPERATIVE SYSTEM

The present application is a national stage of PCT International Application No. PCT/KR2009/005065, filed Sep. 8, 2009, and claims the benefit of US Provisional Application No. 61/099,898, filed Sep. 24, 2008. The present national stage application also claims the benefit of Korean Patent Application No. 10-2008-0108206, filed Nov. 3, 2008.

TECHNICAL FIELD

The present invention relates to radio communications, and more particularly, to a method of controlling uplink power in a radio communication system supporting co-operative communication of a plurality of relay stations, and a mobile station supporting the method.

BACKGROUND ART

Recently, with the generalization of information communication services, the introduction of various multimedia services, and the advent of high-quality services, a demand on radio communication services has been rapidly increased. To satisfy such a demand, various radio communication techniques are being researched in many fields. Examples thereof include various diversity schemes and a cooperative transmission scheme using neighboring base stations.

The diversity scheme implies that the same data is transmitted in a repetitive and/or redundant manner to ensure reliability of communication. When the same data is transmitted through a plurality of independent paths, i.e., a diversity branch, even if an error occurs in data of a certain path, original data can be recovered from data of other remaining paths. Therefore, the diversity scheme is a method proposed to achieve reliable data transmission and/or reception through independent multiple paths. Examples of the diversity scheme include a frequency diversity scheme of transmitting signals at different frequencies, a time diversity scheme of transmitting signals at different times, a spatial diversity scheme of using a plurality of transmit (Tx) antennas, etc.

Research on a multi-cell cooperative radio communication network capable of obtaining a diversity gain by using cooperative communication of a plurality of base stations has actively been conducted in recent years. The multi-cell cooperative communication has been introduced to provide cell coverage extension, throughput enhancement, performance enhancement in a cell edge region, etc. Such a 'multi-cell cooperative radio communication system' can be regarded as a radio communication system performing diversity transmission by using a plurality of relay stations.

Meanwhile, in a global system for mobile communication (GSM)/general packet radio service (GPRS)/enhanced data rates for GSM evolution (EDGE) communication system or a $3^{rd}$ generation or next generation radio communication system, a mobile station periodically measures a receive (Rx) signal level and signal quality of a serving cell, i.e., a cell to which the mobile station belongs. Information on the measured Rx signal level and/or signal quality is used for various purposes, and in particular, can be used to determine power that is output from the mobile station for uplink (UL) transmission (hereinafter, referred to as 'UL power').

Controlling of UL power is a basic element of a radio communication system. The purpose of controlling UL power is to regulate a magnitude of a signal received from a base station to an appropriate level. By maintaining the magnitude of the received signal to the appropriate level, unnecessary power consumption of the mobile station can be avoided, and a data transfer rate or the like can be adaptively determined, which is effective to improve transfer efficiency.

In general, controlling of UL power is classified into two elements, i.e., open-loop power control and closed-loop power control. The former includes an operation of compensating for UL Tx power by measuring (or estimating) a path-loss for a downlink (DL) signal and then by predicting a path-loss for a UL signal and an operation of determining UL power by considering an amount of radio resources allocated to a corresponding mobile station or an attribute of data to be transmitted. The latter is an operation of controlling UL power by using information included in a closed-loop power control message or the like delivered from the base station. Equation 1 shows a method of determining UL Tx power as described above.

$$P(i)=\{P_{MAX}, \alpha \times PL+A(i)+f(i)\} \text{ [dBm]} \quad \text{[Equation 1]}$$

Herein, P(i) denotes UL Tx power at an $i^{th}$ time point, and $P_{MAX}$ denotes maximum Tx power of the mobile station. In addition, PL denotes an estimated path-loss value for a DL signal. $\alpha$ and A(i) denote an attribute of data to be transmitted and a high-layer signal at the $i^{th}$ time point and a parameter given by an amount of allocated resources, and these two components correspond to open-loop power control. f(i) denotes a power control value at the $i^{th}$ time point determined by information included in a closed-loop power control message provided from the base station, and corresponds to closed-loop power control.

In Equation 1, a primary purpose of the open-loop power control is to regulate a magnitude of a Tx signal provided from a mobile station, i.e., UL power, to a appropriate level by considering an estimated or calculated path-loss level for a DL signal under the assumption that a path-loss level for a UL signal coincides with a path-loss level for a DL signal. Herein, an appropriate magnitude of the Tx signal is determined by the parameter A(i). The purpose of the closed-loop power control corresponding to f(i) of Equation 1 is to compensate for inconsistency of path-losses for UL and DL signals and channel fading that changes with a faster time-scale than an average signal path-loss.

As described above, the conventional method of controlling uplink (UL) power includes an open-loop power control parameter and a closed-loop power control parameter. Among them, the former is a parameter for performing power control by estimating a path-loss for a downlink (DL) signal from a base station (BS) in a cell to which a mobile station (MS) belongs and by compensating for the path-loss for the DL signal. For example, if a distance from the MS to the BS to which the MS is connected is increased and thus the path-loss for the DL signal is great, UL power is controlled to increase UL transmit (Tx) power. The latter is a parameter for controlling UL power in such a manner that the BS directly delivers information (i.e., a control signal) required for regulation of UL Tx power.

However, cooperative communication between BSs is not considered in the conventional method of controlling UL power. More specifically, according to the conventional method of controlling UL power, it is assumed that, in open-loop power control, each MS considers only a path-loss for a signal from a BS in a cell to which the MS belongs, and in closed-loop power control, each MS receives a control signal also from the BS in the cell to which the MS belongs. Therefore, direct use of the aforementioned conventional method of controlling UL power is inappropriate in an environment where a UL signal is transmitted in cooperation of several BSs.

For example, assume that a UL signal with sufficient quality can be created in cooperation with neighboring BSs even if a path-loss for a signal from the BS in the cell to which the MS belongs is great. In this case, UL power has to be increased to some extent if the conventional method is directly used (i.e., if cooperative communication between BSs is not considered). The increase in the UL power of the MS results in the increase in energy consumption of the MS. In addition, a signal transmitted with high power may have an adverse effect on communication of other MSs.

DISCLOSURE OF INVENTION

Technical Problem

The present invention provides a method of controlling UL power, capable of considering cooperative communication using a plurality of BSs in a multi-cell cooperative radio communication system in which communication is achieved in cooperation between BSs, and an MS supporting the method.

The present invention also provides a method of controlling UL power, capable of properly controlling UL power by considering a neighboring BS even if a DL signal received from a serving BS has a great path-loss in a multi-cell cooperative radio communication system, and an MS supporting the method.

The present invention also provides a method of controlling UL power, capable of adaptively determining UL power by considering whether cooperative communication is performed between cells and/or by considering a cooperative communication scheme such as cooperation between cells in a multi-cell cooperative radio communication system, and an MS supporting the method.

Technical Solution

In an aspect, a method of controlling uplink transmit power, comprising the steps of: (a) calculating an estimated path-loss value for each of downlink signals from a control base station and one or more neighboring base stations; (b) obtaining a signal path-loss value by using the calculated plurality of estimated path-loss values; and (c) obtaining an open-loop power control parameter by using the signal path-loss value.

In another aspect, a method of controlling uplink power, the method comprising: obtaining, by a control base station, closed-loop power control information by performing communication with one or more neighboring base stations; generating, by the control base station, a signal comprising the closed-loop power control information, and transmitting the signal to a mobile station; and obtaining, by the mobile station, a closed-loop power control parameter by using the closed-loop power control information.

In another aspect, a method of controlling uplink power, the method comprising: receiving a signal comprising closed-loop power control information from a control base station and one or more neighboring base stations; and obtaining a closed-loop power control parameter by using a plurality of pieces of the received closed-loop power control information.

Advantageous Effects

According to an exemplary embodiment of the present invention, uplink power can be controlled by considering cooperative communication of a plurality of base stations in a multi-cell cooperative radio communication system. In particular, uplink power is properly regulated by considering a neighboring base station even if a downlink signal received from a base station in a cell to which a mobile station belongs has a great path-loss. Thus, it is possible to avoid unnecessary waste of power consumption of the mobile station when uplink transmit power is excessively increased or it is possible to avoid excessive interference on communication of a neighbor mobile station. In addition, according to an embodiment of the present invention, uplink transmit power can be adaptively controlled using a method of performing cooperative communication between base stations, and thus transmit power can be effectively controlled.

MODE FOR THE INVENTION

Hereinafter, the present invention will be described in detail by explaining exemplary embodiments of the invention with reference to the accompanying drawings. The same reference numbers will be used throughout the drawings to refer to the same constitutional elements.

Figure 1:
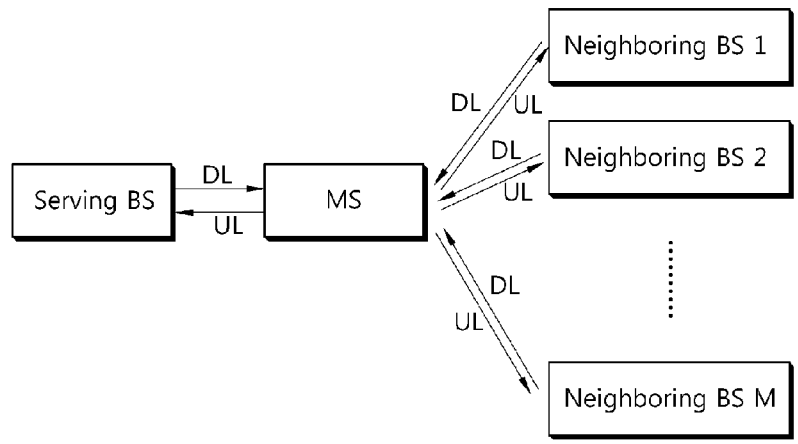
FIG. 1 is a block diagram showing an exemplary structure of a multi-cell cooperative radio communication system to which an embodiment of the present invention can be applied.

FIG. 1 is a block diagram showing an exemplary structure of a multi-cell cooperative radio communication system to which an embodiment of the present invention can be applied. Referring to FIG. 1, the multi-cell cooperative radio communication system includes a mobile station (MS), a base station (BS) located in a cell to which the MS belongs (hereinafter, such a BS is referred to as a serving BS), and neighboring BSs located in M neighboring cells (where M is an integer greater than or equal to 1). The multi-cell cooperative radio communication system can be widely deployed to provide various communication services such as voice, packet data, etc. Not only the serving BS but also the neighboring BSs participate in transmitting and receiving of a downlink (DL) signal and/or an uplink (UL) signal.

An MS may be fixed or mobile, and may be referred to as another terminology, such as a user equipment (UE), a user terminal (UT), a subscriber station (SS), a wireless device, etc. The MS includes at least a transceiver and a processor. The transceiver is an entity by which the MS can transmit and receive various signals and data (i.e., UL signals and DL signals) through a wireless network such as a mobile communication network. The processor controls an operation of the MS and generates a UL signal to be transmitted through the transceiver or to decode a received DL signal. Further, the processor performs a function for controlling UL power according to the embodiment of the present invention to be described below.

A BS (i.e., a serving BS and a neighboring BS) is generally a fixed station that communicates with the MS and may be referred to as another terminology, such as an evolved node-B (eNB), a base transceiver system (BTS), an access point, etc. The BS may periodically transmit a specific signal to the MS so that the signal is used to measure a signal path-loss. Further, the BS generates a control signal for closed-loop power control and transmits the control signal to the MS. In the latter case, a serving BS can generate a suitable control signal by exchanging information with other neighboring BSs.

An embodiment of the present invention described below can be applied to various radio communication systems.

For example, the embodiment of the present invention can also be applied not only to a communication system having a plurality of transmit (Tx) antennas but also to a communication system having one Tx antenna. Such a radio communication system may be not only a multiple input multiple output (MIMO) system or a multiple input single output (MISO) system but also a signal input single output (SISO) system or a single input multiple output (SIMO) system. In addition, the embodiment of the present invention can be applied irrespective of a channel coding scheme of a radio communication system. The channel coding scheme may use various well-known codes such as convolution code, a turbo code, etc.

Further, the embodiment of the present invention can be applied to all multi-cell cooperative radio communication systems irrespective of a specific scheme in which a serving BS and a neighboring BS cooperate with each other. That is, the embodiment of the present invention can be applied to the multi-cell cooperative radio communication system irrespective of a specific scheme in which DL signals are transmitted by the serving BS and the neighboring BS in the multi-cell cooperative radio communication system or a specific scheme in which UL signals received by the serving BS and the neighboring BS are combined.

Furthermore, the embodiment of the present invention described below can be applied to a radio communication system including a relay station (RS). In general, in the radio communication system including the RS, MSs located within a coverage of a BS can directly communicate with the BS and/or can communicate with the BS via one or more RSs. As such, a radio communication system in which communication is achieved in cooperation of a plurality of RSs is referred to as a multi-RS based cooperative radio communication system. The embodiment of the present invention described below can also be applied to the multi-RS based cooperative radio communication system. If the embodiment of the present invention is applied to the multi-RS based cooperative radio communication system, the serving BS and the neighboring BS of FIG. 1 respectively correspond to a BS in a cell and one or more RSs which relay communication between the BS and an MS.

Next, a method of controlling UL power in a multi-cell cooperative radio communication system will be described according to an embodiment of the present invention.

According to the embodiment of the present invention, UL power of an MS is controlled by considering cooperative communication between a serving BS and a neighboring BS in the multi-cell cooperative radio communication system of FIG. 1. In the cooperative communication between BSs, a serving BS (hereinafter, referred to as a 'control BS') receives a UL signal and also uses a UL signal received from a neighboring cell. Therefore, in the method of controlling UL power according to the embodiment of the present invention, UL transmission considers not only a UL signal received from the control BS but also a UL signal received from the neighboring BS. As a result, when UL power is controlled, UL Tx power is determined by considering both the control BS and the neighboring BS.

Figure 2:
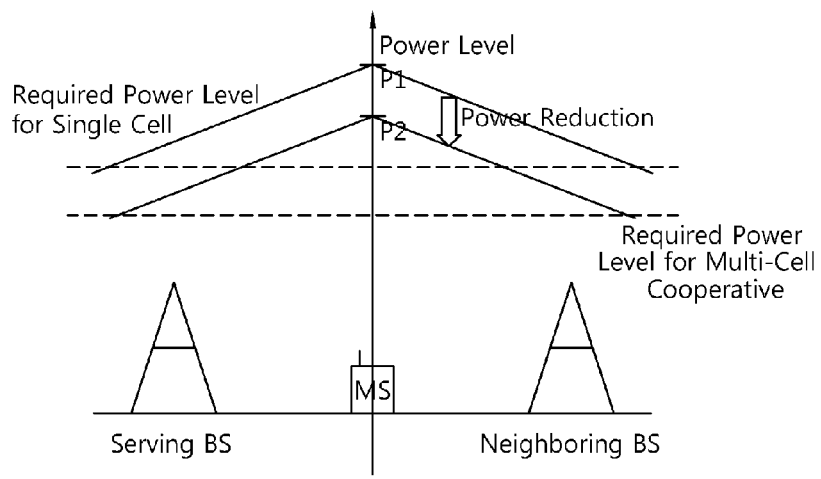
FIG. 2 is a schematic view showing necessity of considering cooperative communication between base stations when uplink power is controlled in a multi-cell cooperative radio communication system.

FIG. 2 is a schematic view showing necessity of considering cooperative communication between BSs when UL power is controlled in a multi-cell cooperative radio communication system.

Referring to FIG. 2, a required power level of a control BS for a single-cell radio communication system is greater than a required power level of the control BS and its neighboring BS for a multi-cell cooperative radio communication system. In this case, for the single-cell radio communication system, a Tx power level of an MS is at least P1 and the MS transmits a UL signal with a magnitude of at least P1, whereas for the multi-cell cooperative radio communication system, UL transmission can be successfully performed even if the Tx power level is set to P2. Therefore, according to an embodiment of the present invention, cooperation between BSs are considered to control UL power, and thus the MS can be prevented from transmitting a UL signal by using an inappropriate high level of power.

In a sense that UL Tx power can be determined by using the same parameter as that included in Equation 1 above, the embodiment of the present invention is not much different in form from the conventional method of controlling UL power in the single-cell radio communication system. However, according to the embodiment of the present invention, each parameter of Equation 1 is obtained or determined by considering multi-cell cooperative communication (i.e., a path-loss of a signal from a neighboring BS is considered together and/or channel information provided from the neighboring BS is considered in a closed-loop power control signal). Thus, a meaning of the parameter or a method of obtaining the parameter is totally different from the conventional method of determining the UL Tx power in the single-cell radio communication system.

Hereinafter, as expressed by Equation 1, the method of controlling UL power according to the embodiment of the present invention will be described by classifying it into two categories, i.e., open-loop power control and closed-loop power control. However, it should be noticed that the embodiment of the present invention may be applied to both a method for open-loop power control and a method for closed-loop power control or may be applied only any one of the two methods.

Open Loop Power Control

Figure 3:
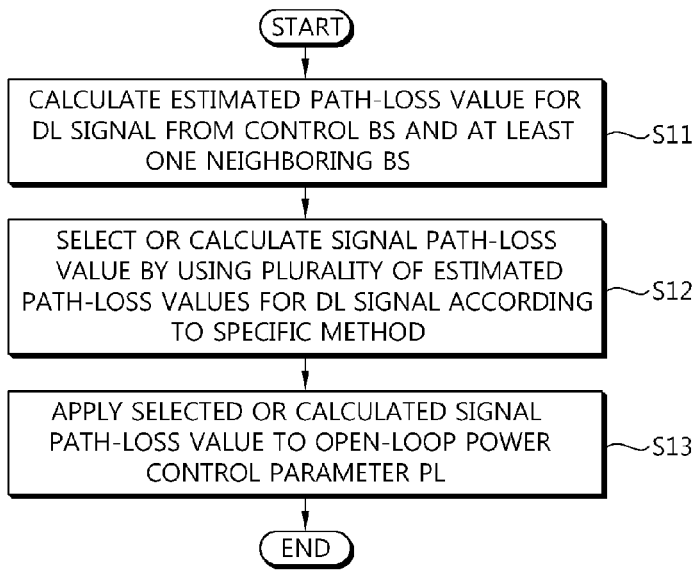
FIG. 3 is a flowchart showing a method for open-loop power control according to an embodiment of the present invention.

FIG. 3 is a flowchart showing a method for open-loop power control according to an embodiment of the present invention.

Referring to FIG. 3, an MS calculates an estimated path-loss value for a DL signal from a control BS and one or more neighboring BSs (step S11). For this, it is assumed that, in a multi-cell cooperative radio communication system to which the embodiment of the present invention is applied, the MS can calculate an estimated path-loss value for a signal from not only a serving BS but also M neighboring BSs (where M is an integer greater than or equal to 1). In order for the MS to calculate or measure a path-loss of a signal from the neighboring BSs, the control BS delivers information for channel estimation together with a list of BSs participating in cooperative communication, that is, a list of neighboring BSs.

The estimated signal path-loss value calculated in step S11 may be obtained to calculate a parameter PL when the aforementioned Equation 1 is applied to the embodiment of the present invention. For this, a plurality of estimated path-loss values obtained in step S11 for DL signals are used to select or calculate a signal path-loss value according to a specific method (step S12). Hereinafter, PL0 denotes a path-loss value for a receive (Rx) signal from a control BS, and PLn denotes a path-loss value for a DL signal from an $n^{th}$ neighboring BS.

Unlike in the conventional method in which the estimated path-loss value for a signal from the control BS is set to the value PL of Equation 1, in step S12, the signal path-loss value (i.e., the value PL of Equation 1) is obtained by using the plurality of estimated path-loss values for DL signals. Therefore, the present invention can determine UL Tx power by considering cooperative communication between neighboring BSs. As a result, excessive increase of Tx power of the MS can be prevented.

A detailed method of using a plurality of estimated path-loss values for DL signals can be configured in various manners.

First, communication may be achieved without inter-cell cooperation in a specific case (e.g., in a case where an MS is located very close to a control BS) even if a multi-cell cooperative radio communication system is used. A path-loss value calculated for a DL signal in this step may be calculated by using the same method as used in the single-cell radio communication system. In this case, a signal path-loss value $PL_A$ for open-loop power control according to the embodiment of the present invention is $PL_0$.

If inter-cell cooperation is performed, signal path-loss values $PL_B$ and $PL_C$ for open-loop power control are calculated differently from the conventional method. More specifically, the signal path-loss values $PL_B$ and $PL_C$ may differ according to a method of performing cooperation by neighboring BSs, that is, according to a specific form of performing cooperative communication between neighboring cells. A method of performing cooperative communication and a method of calculating the signal path-loss values $PL_B$ and $PL_C$ correspond to each other in the following two examples. However, the embodiment of the present invention is not necessarily limited thereto.

For example, assume that the method of performing cooperative communication is for processing a UL signal of a BS which receives a signal with a greatest magnitude from an MS among a control BS and M neighboring BSs participating in cooperative communication. In this case, a signal path-loss value for open-loop power control in the multi-cell cooperation radio communication system (i.e., the signal path-loss value $PL_B$ in step S12 of FIG. 3) is determined such that, among estimated path-loss values obtained in step S11 for DL signals with respect to the control BS and the neighboring BSs participating in cooperation, a smallest value is the signal path-loss value $PL_B$ obtained in step S12. This can be expressed by Equation 2 below.

$$PL_B = \min_{n \leftarrow C} PL_n \qquad \text{[Equation 2]}$$

Herein, C denotes a set of cells participating in cooperation to receive a UL signal of a corresponding MS, and includes a control BS.

Next, assume that the method of performing cooperative communication is for processing a UL signal by combining signals received from an MS by a control BS and M neighboring BSs participating in cooperative communication. In this case, a signal path-loss value for open-loop power control in the multi-cell cooperative radio communication system (i.e., the signal path-loss value $PL_C$ in step S12 of FIG. 3) is determined such that a value obtained by combining estimated path-loss values calculated in step S11 for DL signals with respect to the control BS and the neighboring BSs participating in cooperation according to a specific method is the signal path-loss value $PL_C$ obtained in step S12. Hereinafter, an example of such a method will be described in greater detail.

First, it is assumed that a UL Tx signal received by an $n^{th}$ BS can be expressed by Equation 3.

$$r_n = \sqrt{g_n P} e^{j\theta_n} S + \eta_n \qquad \text{[Equation 3]}$$

Herein, $$g_n = 10^{-0.1 \times PL_n}$$

denotes a channel gain with respect to the $n^{th}$ BS, P denotes Tx power, $\theta_n$ denotes a channel phase, S denotes a Tx signal, and $\eta_n$ denotes noise power.

Under the assumption that each BS has the same noise power, if Tx signals of respective BSs are combined to maximize a signal to noise ratio (SNR) of a combined signal, the combined signal can be expressed by Equation 4.

$$r = \sum_{n \subset C} \frac{\sqrt{g_n}}{\sqrt{\sum_{m=C} g_m}} e^{-j\theta_n} r_n = \qquad \text{[Equation 4]}$$

$$\left( \sqrt{\sum_{n=C} g_n} \right) \sqrt{P} S + \sum_{n \subset C} \frac{\sqrt{g_n}}{\sqrt{\sum_{m=C} g_m}} e^{-j\theta_n} \eta_n$$

A noise component next to a plus sign in the right side of Equation 4 is equal to noise power of Equation 3 under the assumption that each BS has the same noise power. By using these Equations, a path-loss for the combined signal can be expressed by Equation 5.

$$PL_C = -10 \log_{10} \left( \sum_{n=C} g_n \right) \qquad \text{[Equation 5]}$$

The signal path-loss value calculated in step S12 may be calculated according to several methods other than the aforementioned three methods by using the estimated path-loss value obtained in step S11 for a DL signal with respect to each BS. In this case, instead of calculating a signal path-loss value by using any one of the methods in step S12, the MS may calculate the signal path-loss value by adaptively selecting a most suitable method from a plurality of selectable methods (e.g., methods suitable for various cases where a signal has a path-loss).

Alternatively, a control BS or one or more BSs participating in cooperative communication may specify a method to be used to calculate a signal path-loss value in step S12, and an MS may calculate a signal path-loss value according to the specified method. Alternatively, the control BS or the one or more BSs participating in cooperative communication may report information on a method used in multi-cell cooperative communication to the MS, and the MS may select a method to be used to obtain the signal path-loss value in step S12 by using the received information on the method used in cooperative communication.

Referring continuously to FIG. 3, by using the signal path-loss value calculated or selected in step S12, the MS obtains a UL Tx power value (step S13). For example, the signal path-loss value obtained in step S12 may be used as the value PL of Equation 1 above to obtain the UL Tx power value.

Closed Loop Power Control

Figure 4:
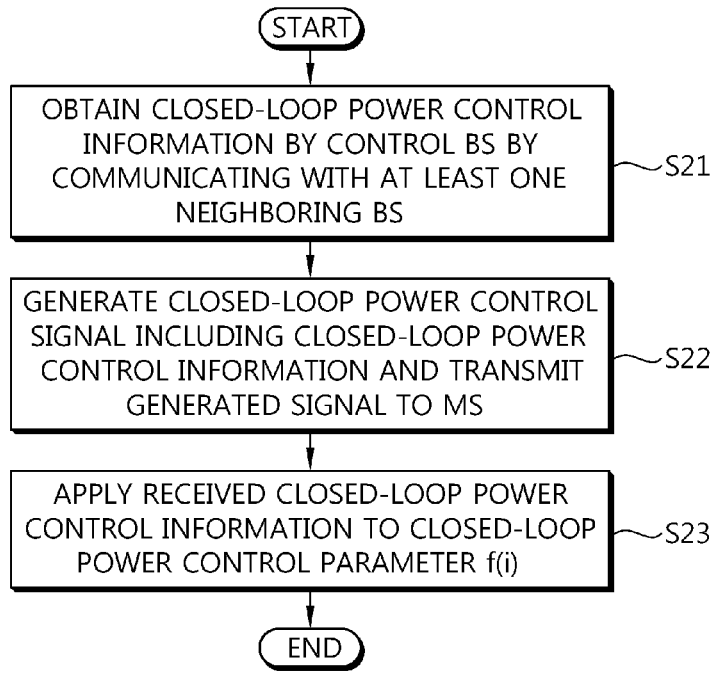
FIG. 4 is a flowchart showing a method for closed-loop power control according to an embodiment of the present invention.

FIG. 4 is a flowchart showing a method for closed-loop power control according to an embodiment of the present invention.

Referring to FIG. 4, a control BS communicates with one or more neighboring BSs participating in cooperative communication to obtain closed-loop power control information (step S21). Herein, the 'closed-loop power control information' denotes information that can be used in a closed-loop power control parameter (e.g., f(i) of Equation 1) when UL Tx power is calculated according to a specific method. In this step, there is no specific restriction on a communication method between the control BS and its neighboring BSs. A detailed method in which the control BS obtains the closed-loop power control information by communicating with its neighboring BSs can be variously configured.

For example, the control BS may receive information indicating signal quality measured by each neighboring BS (e.g., signal to interference plus noise ratio (SINR)), and then may obtain the closed-loop power control information by considering only a BS specifying best quality from the received information or may obtain the closed-loop power control information by using the received information to maintain quality of a combined signal to a suitable level, wherein the combined signal is a combination of signals from respective BSs.

The control BS generates a signal including the closed-loop power control information obtained in step S21 and transmits the generated signal to an MS (step S22). The MS applies the received closed-loop power control information to a closed-loop power control parameter of a UL Tx power value (e.g., the parameter f(i) of Equation 1) (step S23).

In a method for closed-loop power control according to another embodiment of the present invention, all neighboring BSs participating in cooperative communication with a control BS individually transmit a signal including closed-loop power control information to an MS. By using the received closed-loop power control information, the MS obtains a closed-loop power control parameter of a Tx power value (e.g., the parameter f(i) of Equation 1) according to a specific method. This method is different from that used in the embodiment described above with reference to FIG. 4 in a sense that a network side does not specify a value of a closed-loop power control parameter but provides only basic information required to obtain the control parameter.

According to this embodiment, an MS may recognize inconsistency of closed-loop power control information received from a plurality of BSs. For example, a control BS may send control information for instructing power increase when a neighboring BS sends control information for instructing power decrease. In this case, the MS can appropriately process the inconsistent control signal from the BSs by considering detailed content of the inconsistent control information (e.g., whether opposite instructions are indicated or whether the same instruction is indicated only with a difference to some extent), a priority between BSs transmitting the inconsistent control information (e.g., a suitable priority is assigned according to a distance from each BS to the MS, a throughput of each BS (i.e., Tx/Rx power), and/or a channel condition, or a top priority is assigned to the control BS unconditionally and the rest of priorities are assigned to the neighboring BSs according to a specific criterion), and/or a signal path-loss level of a DL signal According to one exemplary embodiment, a signal regarded by an MS as a most important signal may be a signal delivered from a BS for which an estimated path-loss value for a DL signal is smallest, and the MS may use closed-loop power control information received from a BS for which an estimated path-loss value for a DL signal is smallest among BSs transmitting inconsistent control signals. Alternatively, the MS may set a closed-loop power control parameter to a value obtained by simply averaging or properly weight-averaging closed-loop power control information received from each BS. In the latter case, a weight factor for each BS can be determined using an estimated path-loss value for a DL signal from each BS. For example, the weight factor can be expressed with a decreasing function for the estimated path-loss value for a DL signal.

Alternatively, according to an embodiment of the present invention, if any one piece of received closed-loop power control information instructs power increase, an MS may properly regulate a closed-loop power control parameter unconditionally to increase UL Tx power. In this case, the MS can reliably transmit signals for all BSs. On the contrary, if any one piece of the received closed-loop power control information instructs power decrease, the MS may properly regulate the closed-loop power control parameter unconditionally to decrease UL Tx power. In this case, the MS can reliably transmit signals for at least one BS.

Figure 5:
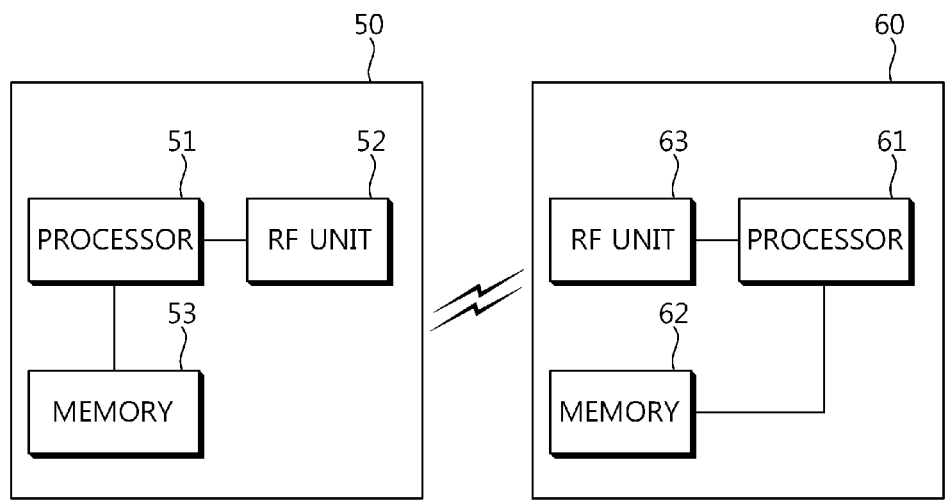
FIG. 5 is a block diagram showing radio communication system to implement an embodiment of the present invention.

FIG. 5 is a block diagram showing radio communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method of controlling uplink transmit power, the method comprising:
   (a) calculating an estimated path-loss value for each of downlink signals from a control base station and one or more neighboring base stations;
   (b) obtaining a signal path-loss value by using the calculated plurality of estimated path-loss values; and
   (c) obtaining an open-loop power control parameter by using the signal path-loss value,
   wherein, in operation (b), the signal path-loss is obtained based on an inter-cell cooperative communication scheme between the control base station and the neighboring base stations,
   wherein the inter-cell cooperative communication scheme combines an uplink signal received by the control base station and uplink signals respectively received by the neighboring base stations,
   wherein the signal path-loss value of operation (b) can be expressed by a function of a plurality of estimated path-loss values obtained in operation (a),
   wherein the inter-cell cooperative communication scheme selects an uplink signal with best quality from uplink signals received by the control base station, and
   wherein the signal path-loss value of operation (b) is an estimated path-loss value for a downlink signal having a smallest magnitude among signals received from the control base station and the neighboring base stations.

2. The method of claim 1, further comprising:
   providing by the control base station a list of the neighboring base stations participating in combining of the uplink signals,
   wherein, in operation (a), the estimated path-loss value is calculated only for a neighboring base station included in the list.

3. The method of claim 1, wherein the function is expressed by Equation (E-1):

$$PL_C = -10\log_{10}\left(\sum_{n=C} g_n\right), \quad (E\text{-}1)$$

where a set C comprises the control base station and the neighboring base stations, $g_n = 10^{-0.1 \times PL_n}$, and $PL_n$ is an estimated path-loss value for a downlink signal of an $n^{th}$ neighboring base station.

4. An apparatus for controlling uplink transmit power, the apparatus comprising:
   a radio frequency (RF) unit configured to transmit and receive radio signals; and
   a processor connected to the RF unit and configured to:
   (a) calculate an estimated path-loss value for each of downlink signals from a control base station and one or more neighboring base stations;
   (b) obtain a signal path-loss value by using the calculated plurality of estimated path-loss values; and
   (c) obtain an open-loop power control parameter by using the signal path-loss value,
   wherein, in operation (b), the signal path-loss is obtained based on an inter-cell cooperative communication scheme between the control base station and the neighboring base stations,
   wherein the inter-cell cooperative communication scheme combines an uplink signal received by the control base station and uplink signals respectively received by the neighboring base stations,
   wherein the signal path-loss value of operation (b) can be expressed by a function of a plurality of estimated path-loss values obtained in operation (a),
   wherein the inter-cell cooperative communication scheme selects an uplink signal with best quality from uplink signals received by the control base station, and
   wherein the signal path-loss value of operation (b) is an estimated path-loss value for a downlink signal having a smallest magnitude among signals received from the control base station and the neighboring base stations.

5. The apparatus of claim 4, further comprising:
   providing by the control base station a list of the neighboring base stations participating in combining of the uplink signals,
   wherein, in operation (a), the estimated path-loss value is calculated only for a neighboring base station included in the list.

6. The apparatus of claim 4, wherein the function is expressed by Equation (E-1):

$$PL_C = -10\log_{10}\left(\sum_{n=C} g_n\right), \quad (E\text{-}1)$$

where a set C comprises the control base station and the neighboring base stations, $g_n = 10^{-0.1 \times PL_n}$, and $PL_n$ is an estimated path-loss value for a downlink signal of an $n^{th}$ neighboring base station.

* * * * *